(12) United States Patent
Kecht et al.

(10) Patent No.: US 10,040,995 B2
(45) Date of Patent: Aug. 7, 2018

(54) ALKALI METAL AND ALKALINE EARTH METAL NIOBATES AND TANTALATES AS SECURITY FEATURE SUBSTANCES

(71) Applicant: GIESECKE & DEVRIENT GMBH, München (DE)

(72) Inventors: Johann Kecht, München (DE); Stephan Steinlein, München (DE); Kai Uwe Stock, Grünwald (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 137 days.

(21) Appl. No.: 15/145,042

(22) Filed: May 3, 2016

(65) Prior Publication Data

US 2016/0243876 A1 Aug. 25, 2016

Related U.S. Application Data

(63) Continuation of application No. 13/808,973, filed as application No. PCT/EP2011/003399 on Jul. 7, 2011, now Pat. No. 9,453,162.

(30) Foreign Application Priority Data

Jul. 9, 2010 (DE) .................. 10 2010 026 627

(51) Int. Cl.
| | |
|---|---|
| C09K 11/67 | (2006.01) |
| C09K 11/77 | (2006.01) |
| B42D 15/00 | (2006.01) |
| B42D 25/36 | (2014.01) |
| D21H 21/48 | (2006.01) |
| G07D 7/1205 | (2016.01) |
| B42D 25/29 | (2014.01) |
| B42D 25/382 | (2014.01) |
| B42D 25/387 | (2014.01) |

(52) U.S. Cl.
CPC .......... C09K 11/7756 (2013.01); B42D 15/00 (2013.01); B42D 25/36 (2014.10); C09K 11/7701 (2013.01); C09K 11/7703 (2013.01); D21H 21/48 (2013.01); G07D 7/1205 (2017.05); B42D 25/29 (2014.10); B42D 25/382 (2014.10); B42D 25/387 (2014.10)

(58) Field of Classification Search
CPC ............ C09K 11/7708; C09K 11/7776; C09K 11/66–11/69; C09K 11/62–11/64; C09K 11/60; C09K 11/58; C09K 11/57
See application file for complete search history.

(56) References Cited

U.S. PATENT DOCUMENTS

| | | | |
|---|---|---|---|
| 3,242,096 A | 3/1966 | Vincent | |
| 4,452,843 A | 6/1984 | Kaule et al. | |
| 6,330,939 B1 | 12/2001 | Pratt | |
| 7,075,707 B1 | 7/2006 | Rapaport et al. | |
| 7,241,399 B2 | 7/2007 | Haubold et al. | |
| 7,699,456 B2 * | 4/2010 | Haubold | B41J 2/01 |
| | | | 347/100 |
| 7,999,237 B2 | 8/2011 | Schwenk et al. | |
| 2003/0032192 A1 | 2/2003 | Haubold et al. | |
| 2008/0163994 A1 | 7/2008 | Hoppe et al. | |

FOREIGN PATENT DOCUMENTS

| | | |
|---|---|---|
| CA | 2523027 A1 | 11/2004 |
| CN | 101555625 A | 10/2009 |
| DE | 102004034189 A1 | 2/2006 |
| EP | 0052624 A1 | 6/1982 |
| EP | 0597311 A2 | 5/1994 |
| JP | 2005075838 A | 3/2005 |
| JP | 2009-185202 * | 8/2009 |
| WO | 0220696 A1 | 3/2002 |
| WO | 03054259 A1 | 7/2003 |
| WO | 2006072380 A2 | 7/2006 |

OTHER PUBLICATIONS

Translation for JP 2009-185202, Aug. 20, 2009.*
Sokalska et al, "Growth and spectroscopic properties of LiNbO3 single crystals doped with Nd+3 and Yb+3 ions", Journal of Crystal Growth, 198/199(1999), pp. 521-525.*
Tang, Li-Qin et al. "Luminescent Enhancement in Mg- and Er-Codoped LiNbO3 Crystals", Chinese Physics Letters, vol. 22, No. 3, Feb. 2005. pp. 588-590.
Balakrishnaiah R et al. "Frequency Upconversion Fluorescence Studies of Er3+/Yb3+ codoped KNbO3 Phosphors", Thin Solid Films, Elesvier-Sequoia S.A. Lausanne, CH, vol. 517, No. 14, May 29, 2009, pp. 4138-4142.
International Search Report for PCT/EP2011/003399 dated Oct. 25, 2011.

* cited by examiner

*Primary Examiner* — C Melissa Koslow
(74) *Attorney, Agent, or Firm* — Workman Nydegger

(57) ABSTRACT

The invention relates to a security feature having a luminescent substance with the general formula $AXO_3$: Z (I) or $B_{0.5}XO_3$: Z (II) or $A_{1-2y}B_yXO_3$: Z (III), where A is an alkali metal, B is an alkaline earth metal, X stands for Nb or Ta, Z is the luminescence activator, and y lies between 0 and 0.5. The invention also relates to a security element, a security paper and a value document which is equipped with the security feature according to the invention, and to the use of the luminescent substance with the general formula (I), (II) or (III) as a feature substance for authentication. The luminescent substance is obtained by annealing solid starting materials.

6 Claims, 1 Drawing Sheet

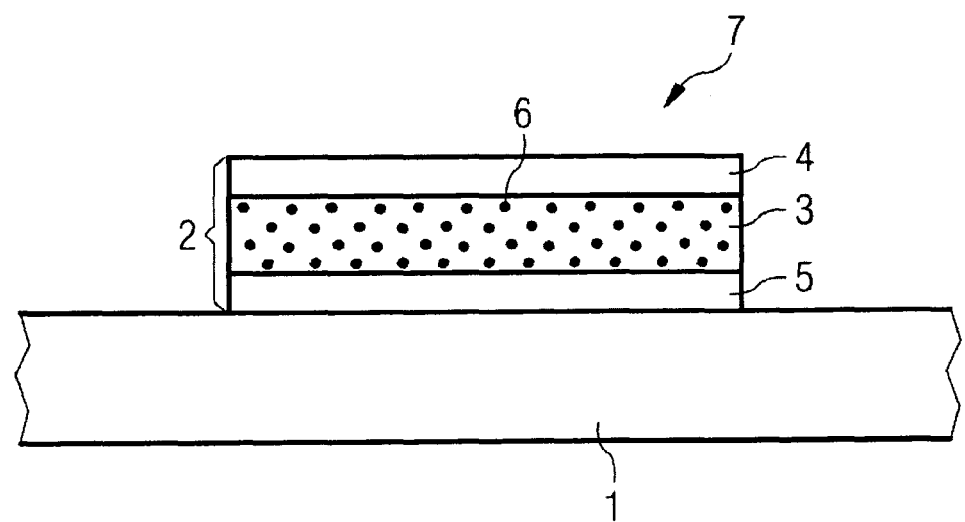

US 10,040,995 B2

ALKALI METAL AND ALKALINE EARTH METAL NIOBATES AND TANTALATES AS SECURITY FEATURE SUBSTANCES

BACKGROUND OF THE INVENTION

A. Field of the Invention

The present invention relates to a security feature having at least one luminescent substance for authenticating an object such as a security element, a security paper, a value document or another object, and to security elements, security papers, value documents or another object equipped with such a security feature, and to the use of the luminescent substance as a security feature substance for authenticating products of any kind.

B. Related Art

Security features or authentication features are marking means that allow a product such as for example a value document or a high-value commodity to be protected from forgery, or any forgeries to be distinguished from originals. Typically, security features have at least one feature substance, for example luminescent, magnetic or electrically conductive substances, which can be detected visually and/or by machine The feature substance or feature substances are arranged in a certain way, for example randomly or in the form of a geometrical or figured pattern or an encoding. This arrangement forms the so-called security feature. Security features for the purposes of the present invention have at least one luminescent substance as a feature substance.

A security element is understood to be an object such as a security thread, a label, a mottling fiber, a transfer element, etc., the object having at least one security feature and being adapted to be applied to an object to be protected, or incorporated into an object to be protected.

A security paper is understood to be a paper that is already equipped with at least one security feature or security element but is not yet fit for circulation, and is an intermediate product in the manufacture of a value document. A value document is understood to be the product fit for circulation.

Value documents are for example bank notes, checks, shares, value stamps, identity cards, credit cards, passports and other documents, as well as packages or other elements for product authentication.

The safeguarding of value documents against forgery by means of luminescent substances has been known for some time. For example, it is disclosed in EP 0 052 624 B2 to use luminescent substances on the basis of host lattices doped with rare earth metals.

In DE 10 2004 034 189 A1 there is described the use of rare earth and transition metal doped compounds with the formula XZO4 as a bank-note security feature, where X can be selected from the series of bivalent or trivalent cations, and Z can be, inter alia, niobium or tantalum.

It is also known to use luminescent substances with host lattices of alkali metal niobates and tantalates for applications in the areas of lasers, nonlinear optics, ferroelectrics, piezoelectrics. For these applications there are typically used single crystals pulled from the melt. However, crystals pulled from the melt do not have the ideal stoichiometric composition, but rather have lattice imperfections. In the case of lithium niobate, for example, pulling from a congruent melt results in a stoichiometry deviating slightly from $LiNbO_3$, with a Li fraction of 48.4 atomic percent (based on Li+Nb). This causes vacancies to arise in the structure. The controlled incorporation of dopants is also difficult upon pulling from the melt, and the dopant concentrations in the melt and in the single crystal sometimes differ greatly.

From U.S. Pat. No. 6,330,939 B1 it is known to use $LiNbO_3$ for specifically influencing the permittivity of a value document. However, $LiNbO_3$ has no doping here and hence does not luminesce.

For luminescent security features there are preferably used substances in which either the absorption or the emission lies outside the visible spectral region. If the emissions lie at wavelengths between about 400 nm and about 700 nm, the luminescent substances are detectable with the eye upon suitable excitation. For some applications this is desired, for example in authenticity checking through illumination with UV light. However, for most applications it is advantageous when the emission lies outside the visible spectral region, because the security features can then be provided in hidden fashion. For detection, special detectors are required.

Luminescent feature substances for security features, i.e. luminescent substances with the characteristic properties that are suited for safeguarding value documents and in particular for automatic authenticity detection, are limited in number, however. Most inorganic and organic luminescent substances have uncharacteristic, wide spectra, a deficient emission intensity or other disadvantages, such as for example being difficult to manufacture. The use of commercially usual luminescent substances for security features is not very recommendable.

Starting out from this prior art, the present invention is based on the object of increasing the number of luminescent substances that are suited for manufacturing security features or authentication features, and in particular of providing security elements, security papers and value documents with security features that do not have the disadvantages of the prior art.

Essential properties that are aimed for in the present invention for the security-feature luminescent substances to be provided within the scope of this invention are in particular: simple manufacturability with the defined, small grain sizes as are required for incorporation into or application to value documents;

high emission intensity, even at small grain sizes, and characteristic, i.e. well identifiable, emission spectra and/or absorption spectra; and emissions preferably in the near infrared region.

The security feature according to the invention has at least one luminescent substance with the general formula I, II, III:

$$AXO_3 : Z \qquad (I)$$

$$B_{0.5}XO_3 : Z \qquad (II)$$

$$A_{1-2y}B_yXO_3 : Z \qquad (III)$$

The index y lies between 0 and 0.5.

SUMMARY OF THE DISCLOSURE

A stands for an alkali metal, preferably lithium, sodium or potassium, particularly preferably lithium. The alkali metal has the oxidation state +1.

B stands for an alkaline earth metal, preferably for magnesium, calcium, strontium, or barium. The alkaline earth metal has the oxidation state +2.

X stands for either or both niobium and tantalum. Niobium and tantalum have the oxidation state +5.

O stands for oxygen with the oxidation state −2.

These elements form a host lattice in which the individual elements can replace each other (e.g. one element A by another element A), as far as the stoichiometry, the size relations and the crystal structures permit.

The host lattices are doped with at least one element or cation luminescing upon suitable excitation, the luminescence activator Z.

The luminescence activator Z is incorporated on lattice sites or interlattice sites of the host lattice.

Z stands for rare earth metals (scandium, yttrium, lanthanum, cerium, praseodymium, neodymium, promethium, samarium, europium, gadolinium, terbium, dysprosium, holmium, erbium, thulium, ytterbium and lutetium), or for certain transition metals in suitable oxidation states. The rare earth metals normally have the oxidation state +3, but samarium, europium, thulium and ytterbium can also occur in the oxidation state +2, and cerium, praseodymium, terbium and dysprosium can occur in the oxidation state +4.

Preferred rare earth metal cations are $Nd^{3+}$, $Dy^{3+}$, $Ho^{3+}$, $Er^{3+}$, $Tm^{3+}$ and $Yb^{3+}$. Preferred transition metal cations are ions of the elements titanium, vanadium, chromium and manganese, for example $Ti^{3+}$, $V^{4+}$, $Cr^{2+/3+/4+/5+}$, $Mn^{3+/4+/5+/6+}$.

The structure of the alkali metal niobates and alkali metal tantalates as well as of the alkaline earth metal niobates and alkaline earth metal tantalates permits a doping with numerous cations Z, the preferred luminescence activators being trivalent cations (for example rare earth metals and chromium). The amount of doping is more than 0 wt %, typically 0.05 to 5 wt % of Z, preferably 0.1 to 2 wt % of Z, based on the total weight of the luminescent substance. Depending on oxidation state and incorporation of the cation Z on a lattice site or interlattice site, certain additional charges are produced in the host lattice. As charge equilibration, vacancies can be generated in the lattice.

Due to its commercial relevance as a component in nonlinear optics or in band-pass filters for high-frequency circuits in mobile telephones, etc., a large share of the scientific studies in the field of alkali metal niobates deals specifically with the matrix lithium niobate. Hence, the different mechanisms and influences of vacancies have been studied in greatest detail on this example. In $LiNbO_3$:SE (SE=rare earth cation) the trivalent cation usually replaces a lithium cation on a lithium lattice site and thus produces two additional charges. As charge equilibration, two $Nb^{5+}$ vacancies are generated for every five replaced lithium cations.

Lattice defects such as vacancies often lead to a worsening of the luminescence properties, so that it may be preferred to incorporate additional elements into the host lattice for charge equilibration in order to minimize lattice defects. Moreover, the host lattice may be additionally doped with at least one element E, which acts as a luminescence sensitizer, and/or serves to suppress certain emission wavelengths, and/or serves for charge equilibration. By minimizing the lattice defects there can be obtained a considerable increase in luminescence intensity. Additional doping with titanium cations has proved especially suitable. In the case of alkali metal niobates and alkali metal tantalates, the excess positive charge of a rare earth metal cation on an alkali metal position (3+ instead of 1+) can for example be equilibrated by the incorporation of two titanium cations (4+) on niobate/tantalate sites (5+). There results in this case a particularly preferred doping ratio of two titanium cations for each rare earth cation.

The additional elements that are incorporated into the host lattice for charge equilibration or for other reasons are not limited in any special way. For example, the element serving for charge equilibration may be selected from the group consisting of transition metal cations, rare earth cations and cations of the elements of the third and fourth main groups. What is essential is primarily suitable ion sizes and ion charges in order to be tolerated by the corresponding host lattice and to be capable of being stabilized therein. In one embodiment, an oxide of at least of an element E may be added, intimately mixed and annealed, and thereby doping the host lattice $AXO_3$ or $BX_2O_6$::Z with the element E. When the element E is incorporated into the host lattice instead of one of the elements A, B or X, the quantity ratios are chosen such that the following holds for the atomic ratios in the doped luminescent substances:

$(A+E):X=1:1$, or $A:(X+E)=1:1$, or $(B+E):X=0.5:1$, or $B:(X+E)=0.5:1$.

Additional elements can be incorporated not only for reasons of charge equilibration but for example also when the luminescence activator has emissions in a wavelength range in which no emissions are desired. Then it is possible through the incorporation of ions that strongly absorb in the relevant wavelength range to suppress unwanted emissions in this range. To suppress unwanted emissions in the visible, for example, elements can be incorporated into the host lattice that strongly absorb in the visible wavelength range, for example transition metals such as $Fe^{3+}$, $Co^{2+}$, $Ni^{2+}$. The element for suppressing certain emission wavelengths may comprise a transition metal cation. In those wavelength ranges where emissions occur and are to be observed or detected, the host lattice must of course be sufficiently transparent optically.

A further possibility is to change the excitability of the luminescent substances through the incorporation of sensitizers into the host lattice. The activators can be excited either through energy transfer from surrounding lattice ions (host lattice sensitized luminescence) or through other foreign ions (sensitizers) which absorb energy and transfer it to the luminescent activators. The formation of activator-sensitizer pairs leads to changed excitation spectra or a higher luminescence intensity. Preferred sensitizers are rare earth cations and transition metal cations, and a particularly preferred one is chromium with the oxidation state +3. For example, through the incorporation of $Cr^{3+}$ into neodymium-doped lithium niobate there can be obtained upon excitation of the chromium an energy transfer from chromium to neodymium.

If absorbent components are also utilized as cations for charge equilibration one can, instead of introducing additional absorbent components into the host lattice, partly replace the absorbent components by non-absorbent components, for example aluminum. Via the fraction of such non-absorbent components it is possible to control the absorption and thus the lightness of the luminescent substance. This can be desirable for example when a luminescent substance is to be used invisibly in a light printing ink or is to be incorporated into a light carrier material.

The incorporation position of the dopants on respective alkali/alkaline earth or niobium/tantalum sites depends, inter alia, on the size of the cation to be incorporated. Additionally, the preference can be influenced by factors such as charge of the cation or the possible oxygen coordination polyhedrons at the incorporation sites. In certain cases, incorporation on both sites is also possible.

Generally, the different matrices behave similarly in their incorporation behavior, however, the larger doping cations tending to lie on alkali or alkaline earth positions and the smaller cations to assume niobium or tantalum positions. Thus there is e.g. for lithium niobate a preference of $Ca^{2+}$, $Mg^{2+}$, $Zn^{2+}$, $La^{3+}$ for 'A' positions (Li replacement), while e.g. $Fe^{3+}$, $Al^{3+}$, $Sc^{3+}$, $Cr^{3+}$, $Zr^{4+}$, $Ti^{4+}$, $Zr^{4+}$, $Ti^{4+}$, $Sn^{4+}$, $U^{6+}$, $W^{6+}$ are preferably to be found on 'B' positions (Nb replacement). For substances such as potassium-strontium-niobate $K_{0.2}Sr_{0.4}NbO_3$ with a tetragonal tungsten bronze structure, the incorporation positions $(A')_2(A'')_4(C)_4(B')_2(B'')_8O_{30}$ are described. The size of the incorporation positions decreases here in the order A'>A''>C. Cations such $Li^+$, $Na^{30}$, $K^+$, $Sr^{2+}$, $Ba^{2+}$, $Bi^{3+}$ or trivalent lanthanide cations are preferably incorporated on the A positions. With certain cations such as $Li^+$ there can likewise take place a partial distribution over otherwise empty C sites. Cations such as e.g. $Fe^{3+}$, $Zr^{4+}$, $Ti^{4+}$, $W^{6+}$ preferably lie on the B positions (Nb replacement).

For increasing the chemical resistance of the luminescent substance it may be advantageous to coat the luminescent substance. The host lattices used according to the invention are generally rather stable with respect to external influences and also insoluble in water. However, they can be attacked by strong acids, which unfavorably changes or even destroys their luminescence properties. Suitable coatings are for example sheaths of a metal oxide, the metal component preferably being an element selected from the group consisting of aluminum, barium, lead, boron, lanthanum, magnesium, silicon, titanium, zinc, zirconium, cobalt, copper, iron and mixtures thereof. Particularly preferable sheaths are of silicon dioxide. Suitable coatings and methods are disclosed for example in WO 2006/072380.

As mentioned hereinabove, certain individual embodiments of the luminescent substances used according to the invention are known in principle but have hitherto not been considered for the field of authentication. They hitherto appeared unsuitable for this purpose. One reason for this is probably that the luminescent substances were hitherto studied primarily in connection with laser applications and were therefore also manufactured in a way suitable for laser applications. Laser applications require single crystals, preferably single crystals as large as possible, and the luminescent substances were accordingly manufactured by a method for obtaining such single crystals, namely by pulling from a congruent melt. However, such melts do not yield alkali metal niobates and tantalates with an exact stoichiometry of A:X=1:1, or alkaline earth metal niobates and tantalates with the exact stoichiometry B:X=0.5:1. The result is lattice imperfections. Moreover, upon pulling from a melt it is usually not possible to obtain a crystal having the same concentration of luminescence activator or other additives as the melt. Instead, the dopant concentrations in the melt and in the crystal can differ strongly. Through depletion or enrichment of the dopants and additives in the melt, differences and gradients in the dopant or additive concentrations of the arising crystals thus necessarily arise in the course of synthesis. Such crystals are only suitable for purposes of authenticity marking to a very limited extent.

According to the invention, the luminescent substances are hence manufactured by annealing intimately mixed starting materials. For manufacturing a luminescent substance with the general formula $AXO_3$:Z, an oxide of the element X and an oxide or carbonate of the element Z are intimately mixed, for example powdered together in a mortar, with an oxide or a hydroxide or a carbonate or a peroxide, preferably a carbonate or a hydroxide, particularly preferably a carbonate, of the element A and annealed at a temperature of 900 to 1200° C., preferably at 1150° C., for 1 to 20 h, preferably for 8 to 10 h.

For manufacturing a luminescent substance with the general formula $B_{0.5}XO_3$:Z, an oxide or a hydroxide or a carbonate or a peroxide, preferably a carbonate, of the element B is used instead of the corresponding compounds of the element A.

Through suitable weighing of the starting materials it is possible to exactly predetermine the stoichiometry of the luminescent substance to be manufactured. According to the invention, a stoichiometry of A:X=1:1 or of B:X=0.5:1 is desired, and these stoichiometries can be obtained without any problems. Likewise, the desired concentration of luminescence activator Z can be reliably predetermined.

It is evident that the above-mentioned stoichiometric ratios of A:X=1:1 or B:X=0.5:1 represent a value that holds for the host lattice by itself and is changed by the doping with the luminescence activator Z and, where applicable, further doping substances. If additional elements are incorporated into the host lattice, such as the activator Z, sensitizers, charge equilibration substances or quenchers in order to suppress the luminescence in a certain wavelength range, the stoichiometric ratios change in the way required by the incorporated amount of the additional elements, i.e. according to the extent to which a certain lattice component is replaced by another element. If for example 5% of an alkali metal A is replaced by an element A' while the other lattice components remain uninfluenced, there accordingly results a stoichiometric ratio of A:A':X=0.95:0.05:1. If the neodymium replaces 5% of the Li fraction of the host lattice in LiNbO3:Nd, and Nb vacancies are produced for charge equilibration, there results the ratio Li:Nb=0.95:0.98. If 1% of the Li fraction of the host lattice is replaced by Nd, and charge equilibration is provided through incorporation of Ti on Nb sites, the resulting ratio is Li:Nb=0.99:0.98.

That different crystal structures are obtained upon pulling from a congruent melt, on the one hand, and in the manufacturing method according to the invention, on the other hand, is very evident from the example of $LiNbO_3$. In the case of lithium niobate there arises through pulling from a congruent melt a crystal with a stoichiometry with 48.4% Li fraction (Li:Nb=48.4:51.6). The resulting vacancies have been intensely studied in the literature, for example in Chinese Physics Letters, Vol. 22, No. 3 (2005) 588, Tang Li-Qin et al. "Luminescent Enhancement in Mg- and Er-Codoped $LiNbO_3$ Crystals". Methods have been found for reducing the vacancies, for example through codoping with magnesium. Codoping with magnesium causes an improvement of luminescence intensity in crystals pulled from the melt. It was found e.g. in erbium-doped $LiNbO_3$ pulled from congruent melts that a codoping with magnesium makes possible a significant increase in luminescence through reduction of certain types of vacancies. In crystals manufactured according to the invention, however, the opposite is surprisingly the case. A codoping of $LiNbO_3$ with magnesium causes no improvement, but rather a worsening of the luminescence intensity. This is ascribed to the fact that the lithium niobate manufactured according to the invention has an atomic ratio of A:X=1:1 and hence has a different defect structure in comparison to "congruent" lithium niobate. The problem-free manufacture of stoichiometric $AXO_3$ and $B_{0.5}XO_3$ by the annealing process constitutes an improvement and simplification compared with crystal pulling from a melt.

The term "annealing," as used herein, describes calcining, firing, and sintering. The annealing process according to the invention does not yield isolated, unagglomerated single crystals, much less large single crystals. This makes the luminescent substances according to the invention relatively unsuitable for the areas of application of lasers, nonlinear optics, ferroelectrics etc., but in no way impairs the purpose of use according to the invention. Instead, grain sizes as small as possible are advantageous, preferably in the range of 1 to 20 if the luminescent substances are to be incorporated into the volume of a security paper or value document. If the luminescent substances are to be used as components of a printing ink, the particles should preferably have a size of less than 6 particularly less than 3 Microcrystalline substances from crystal agglomerates with suitable sizes are also readily employable for the purpose of use according to the invention. After annealing, the crystals or crystal agglomerates can, where applicable, be reduced to suitable grain sizes by grinding in suitable mills, for example a jet mill.

It is especially advantageous in the manufacturing method used according to the invention that powdery material in the desired grain size range can be produced simply by a suitable choice of the annealing conditions. For this purpose, it is generally advantageous to choose an annealing temperature as high as possible in order to obtain a complete reaction of the educts and shorter annealing time. On the other hand, the annealing temperature must be chosen below the melting point of the target matrix in order to prevent the particles from melting together. In certain cases, a further lowering of the annealing temperature is advantageous in order to prevent an excessive sintering of the particles or to limit the grain growth for producing suitable grain sizes. Moreover, it is especially advantageous that the annealing process permits a simple and controlled incorporation of luminescence activators and other dopants, because the fraction of luminescence activator/dopant in the end product is determined solely by the fraction of the corresponding luminescence activator/dopant in the starting materials.

Hereinafter some embodiment examples will be stated for the manufacture of luminescent substances according to the invention.

EXAMPLE 1

$Ca_{0.5}NbO_3$ Doped with Nd (1 Mol %)

2.675 g $CaCO_3$, 7.234 g $Nb_2O_5$ and 0.092 g $Nd_2O_3$ are intimately mixed in an agate mortar. The mixture is annealed in a corundum crucible for 10 h at 1150° C.

EXAMPLE 2

$LiNbO_3$ Doped with Tm (1 Mol %)

2.140 g $Li_2CO_3$, 7.747 g $Nb_2O_5$ and 0.113 g $Tm_2O_3$ are intimately mixed in an agate mortar. The mixture is annealed in a corundum crucible for 10 h at 1150° C.

EXAMPLE 3

$NaTaO_5$ Doped with Nd (1 Mol %)

1.913 g $Na_2CO_3$, 8.025 g $Ta_2O_5$, 0.061 g $Nd_2O_3$ are intimately mixed in an agate mortar. The mixture is annealed in a corundum crucible for 10 h at 1150° C.

EXAMPLE 4

$NaTaO_3$ Doped with Nd (1 Mol %) and Ti (2 Mol %)

1.927 g $Na_2CO_3$, 7.953 g $Ta_2O_5$, 0.062 g $Nd_2O_3$, 0.059 g $TiO_2$ are intimately mixed in an agate mortar. The mixture is annealed in a corundum crucible for 10 h at 1150° C. In comparison to embodiment example 3 the product shows a luminescence intensity that is stronger approx. by a factor of 5, due to the charge equilibration by means of titanium.

EXAMPLE 5

$NaTaO_3$ Doped with Yb (1 Mol %)

1.911 g $Na_2CO_3$, 8.017 g $Ta_2O_5$, 0.072 g $Yb_2O_3$ are intimately mixed in an agate mortar. The mixture is annealed in a corundum crucible for 10 h at 1150° C.

EXAMPLE 6

$NaTaO_3$ Doped with Yb (1 Mol %) and Ti (2 Mol %)

1.925 g $Na_2CO_3$, 7.944 g $Ta_2O_3$, 0.072 g $Yb_2O_3$, 0.059 g $TiO_2$ are intimately mixed in an agate mortar. The mixture is annealed in a corundum crucible for 10 h at 1150° C. In comparison to embodiment example 5 the product shows an approx. 8 times higher luminescence intensity, due to the charge equilibration by means of titanium.

EXAMPLE 7

$LiTaO_3$ Doped with Er (1 Mol %)

1.415 g $Li_2CO_3$, 8.511 g $Ta_2O_5$ and 0.074 g $Er_2O_3$ are intimately mixed in an agate mortar. The mixture is annealed in a corundum crucible for 10 h at 1150° C.

EXAMPLE 8

$Na_{0.2}Sr_{0.4}NbO_3$ Doped with Er (1%)

0.523 g $Na_2CO_3$, 2.840 g $SrCO_3$, 6.543 g $Nb_2O_5$ and 0.094 g $Er_2O_3$ are intimately mixed in an agate mortar. The mixture is annealed in a corundum crucible for 10 h at 1150° C.

EXAMPLE 9

$K_{0.2}Sr_{0.4}NbO_3$ Doped with Nd (1%)

0.672 g $K_2CO_3$, 2.799 g $SrCO_3$, 6.448 g $Nb_2O_5$ and 0.082 g $Nd_2O_3$ are intimately mixed in an agate mortar. The mixture is annealed in a corundum crucible for 10 h at 1150° C.

Variation and combination of the luminescent substances open up numerous possibilities for influencing the excitation spectra and the emission spectra of the luminescent substances and thus manufacturing a multiplicity of security features. Besides the evaluation of the excitation and/or emission spectra, it is likewise possible to use the lifetime or decay time of the luminescence for distinction in a test method. Upon the evaluation there can be taken into consideration besides the wavelengths of the excitation or emission lines also their number and/or shape and/or their intensities, thereby making it possible to represent an arbitrary encoding. Moreover, the luminescent substances can be combined with one or several other feature substances, such as magnetic or electrically conductive feature substances, into a security feature.

The security features according to the invention are formed on or in a carrier material, thereby yielding a security element, a security paper or a value document depending on the kind of carrier material.

For example, upon the manufacture of a security paper or value document based on paper or plastic the luminescent substances can be admixed to the paper stock or plastic mass during the manufacturing process, thereby forming a security feature within the volume of the security paper or value document.

Alternatively, the luminescent substances can be incorporated into a printing ink or a coating composition and be imprinted or applied in another way to a surface of a value document or security paper over the full area or over part of the area, for example in the form of characters or patterns. The resulting security feature can form for example a geometrical or figured representation, writing or an encoding.

Instead of application to, or incorporation in, a carrier material in the form of a security paper or a value document, the security features according to the invention can also be formed on separate carrier materials made of paper or plastic or in separate carrier materials made of paper or plastic. For this purpose, the luminescent substances are admixed to the paper stock or the plastic mass upon the manufacture of the separate carrier material, or they are incorporated into a coating composition or into a printing ink which is in turn applied or imprinted on a surface of the separate carrier material, as described above for security paper and value documents as carrier materials. A carrier material equipped with a security feature in such a way can be used as a security element and be embedded wholly or partly in a security paper or a value document or be fastened to a surface of a security paper or a value document. A security element according to the invention can be for example a security thread, a mottling fiber, a label or a transfer element.

The security feature, the security element, the security paper or the value document having at least one luminescent substance is excited, for checking authenticity, with light of a suitable wavelength in the region between 400 and 1600 nm, particularly preferably between 500 and 1000 nm. Thereupon at least one property (e.g. band intensity, band position, decay time) of the light emitted by the at least one luminescent substance due to the excitation is captured and compared with properties known for the at least one luminescent substance (e.g. in Example 7: emission in the Er bands at 983 and 1543 nm), authenticity being ascertained if the captured and expected properties match sufficiently, i.e. within predefined, tolerable deviations.

DESCRIPTION OF THE DRAWINGS

The invention will hereinafter be explained with reference to a FIGURE. The proportions shown in the FIGURE do not correspond to the relations existing in reality and serve mainly to improve clearness.

FIG. 1 a value document according to the invention in cross section.

DETAILED DESCRIPTION

FIG. 1 shows an embodiment of a value document according to the invention in the form of a bank note 7. The bank note 7 has a carrier material 1 of paper to which a security element 2 according to the invention is stuck. The security element 2 is a sticker which has a paper or plastic layer 3, a transparent cover layer 4 and an adhesive layer 5. The sticker 2 is connected to the value-document substrate 1 via the adhesive layer 5. The luminescent substance 6 is contained within the volume of the layer 3, the random arrangement of the luminescent substance 6 forming the security feature, according to the invention, of the sticker 2.

Alternatively, the luminescent substance could also be contained in a printing ink (not shown) which is imprinted on one of the sticker layers, preferably on the surface of the layer 3.

The invention claimed is:

1. A security feature, comprising at least one luminescent substance for authentication of a security element, a security paper, a value document or another object, the at least one luminescent substance having a host lattice doped with at least one luminescence activator, wherein the at least one luminescent substance has the general formula $AXO_3:Z$ (I) wherein:

A is at least one element selected from the group consisting of alkali metals;

X is either or both Nb and Ta;

Z is the luminescence activator, and is at least one element selected from the group consisting of the rare earth metals and transition metals in the oxidation states in which the relevant transition metals are activatable to luminesce; and wherein the host lattice is additionally doped with at least one element E which serves for charge equilibration.

2. The security feature according to claim 1, wherein the host lattice is additionally doped with a luminescence sensitizer which absorbs energy and transfers it to the luminescence activator and is selected from the transition metal cations.

3. The security feature according to claim 1, wherein the element serving for charge equilibration is selected from the group consisting of transition metal cations, rare earth cations and cations of the elements of the third and fourth main groups.

4. The security feature according to claim 1, wherein the luminescent substance is present in the form of a powder with a grain size between 1 μm and 6 μm.

5. The security feature according to claim 1, wherein the luminescent substance comprises 0.05 to 5 wt % of the luminescence activator Z.

6. The security feature according to claim 1, wherein the luminescent substance has an emission spectrum outside the visible spectral region.

* * * * *